(12) United States Patent
Darcy, III et al.

(10) Patent No.: US 7,531,283 B2
(45) Date of Patent: May 12, 2009

(54) LASER ABLATION OF WELDED SEAM AREA

(75) Inventors: John Joseph Darcy, III, Webster, NY (US); Michael Stephen Roetker, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 492 days.

(21) Appl. No.: 11/155,672

(22) Filed: Jun. 20, 2005

(65) Prior Publication Data
US 2006/0286467 A1 Dec. 21, 2006

(51) Int. Cl.
*G03G 5/00* (2006.01)
(52) U.S. Cl. ................ 430/127; 430/56; 156/73.4; 156/137; 156/272.8
(58) Field of Classification Search ................ 430/56, 430/127; 156/73.4, 137, 272.8
See application file for complete search history.

(56) References Cited

U.S. PATENT DOCUMENTS

| 4,410,575 | A | 10/1983 | Obayashi et al. | |
|---|---|---|---|---|
| 5,688,355 | A | 11/1997 | Yu | |
| 5,709,765 | A * | 1/1998 | Herbert et al. | 156/293 |
| 6,527,105 | B2 | 3/2003 | Tarnawskyj et al. | |
| 2002/0074520 | A1 | 6/2002 | Yu et al. | |
| 2002/0079049 | A1 | 6/2002 | Yu et al. | |
| 2006/0120770 | A1 * | 6/2006 | Swift | 399/288 |

* cited by examiner

*Primary Examiner*—Mark A Chapman
(74) *Attorney, Agent, or Firm*—Pillsbury Winthrop Shaw Pittman LLP

(57) ABSTRACT

A seamless flexible electrophotographic imaging member comprising a flexible substrate strip material having an unmelted photodecomposed seam of carbon-black loaded polyimide polymer.

19 Claims, 2 Drawing Sheets

LASER ABLATION OF WELDED SEAM AREA

BACKGROUND

All references cited in this specification, and their references, are incorporated by reference herein where appropriate for teachings of additional or alternative details, features, and/or technical background.

Disclosed in the embodiments herein is a method for manufacturing a substantially seamless continuous flexible transfer belt of an electrostatographic print device by selecting a carbon-black loaded polyimide polymer belt stock material having a first end and a second end, ultrasonically welding the first end of the belt stock material to its second end to form a seam and laser ablating the seam at the ultrasonically welded area to remove material found on the side of the belt upon which an image is to be carved.

Typical flexible belts used for different kinds of practical application are, generally, prepared in either a seamed or a seamless belt configuration. These flexible belts are commonly utilized to suit numerous functioning purposes such as electrostatographic imaging member belts, conveyor belts, drive belts, intermediate image transfer belts, sheet transport belts, document handling belts, donor belts for transporting toner particles, motor driving belts, torque assist driven belts, and the like.

Flexible belts, such as electrostatographic imaging member belts, are well known in the art. Typical electrostatographic flexible imaging members include, for example, photoreceptors for electrophotographic imaging systems, and electroreceptors or ionographic imaging members for electrographic imaging systems. Both electrophotographic and electrographic imaging member belts are commonly utilized in a seamed belt configuration based from ease of belt fabrication and cost considerations, even though seamless imaging belts are preferred since the whole belt surface is a viable imaging area.

For electrophotographic applications, the flexible imaging member or photoreceptor belts preferably comprise a flexible substrate support coated with one or more layers of photoconductive material. The substrate supports are usually organic materials such as a film forming thermoplastic polymer. The photoconductive coatings applied to these substrates may comprise inorganic materials such as selenium or selenium alloys, organic materials, or combinations of organic and inorganic materials. The organic photoconductive layers may comprise, for example, a single binder layer having dissolved or dispersed therein a photosensitive material or multilayers comprising, for example, a charge generating layer and a charge transport layer. The charge generating layer is capable of photogenerating holes and injecting the photogenerated holes into the charge transport layer. As more advanced, higher speed electrophotographic copiers, duplicators and printers were developed, degradation of image quality has been encountered during extended cycling. Moreover, complex, highly sophisticated duplicating and printing systems operating at very high speeds have placed stringent requirements including narrow operating limits on photoreceptors. One typical type of multilayered imaging member that has been employed as a belt in electrophotographic imaging systems comprises a substrate, a conductive layer, a hole blocking layer, an adhesive layer, a charge generating layer, a charge transport layer, and a conductive ground strip layer adjacent to one edge of the imaging layers. This imaging member may also comprise additional layers, such as an anti-curl back coating layer to flatten the imaging member and an optional overcoating layer to protect the exposed charge transport layer from wear.

The flexible electrographic imaging or ionographic belts though analogous to photoreceptor belts are, however, of simpler material design; these belts, in general, comprise either a flexible single layer conductive substrate support or an insulating substrate support having a conductive metallic surface and overcoated on a dielectric imaging layer. The basic process for using electrostatographic flexible imaging member belts is well known in the art.

A flexible image transfer member is usually fabricated from a sheet cut from an imaging member web. The sheets are generally rectangular in shape. All sides may be of the same length, or one pair of parallel sides may be longer than the other pair of parallel sides. The expression "rectangular," as employed herein, is intended to include four sided sheets where all sides are of equal length or where the length of two equal parallel sides is unequal to the other two equal parallel sides.

The sheets are fabricated into a belt by overlapping opposite marginal end regions of the sheet. A seam is typically produced in the overlapping marginal end regions at the site of joining. Joining may be effected by any suitable means. Typical joining techniques include welding (such as ultrasonic welding), gluing, taping, pressure heat fusing and the like. Typical seamed electrostatographic imaging member belts commonly employed in imaging machines have a welded seam formed from ultrasonic welding process.

Ultrasonic welding may be the method chosen for joining a flexible imaging member because it is rapid, clean and solvent-free and low cost, as well as because it produces a thin and narrow seam. In addition, ultrasonic welding may be preferred because the mechanical high frequency pounding of the welding horn causes generation of heat at the contiguous overlapping end marginal regions of the flexible imaging sheet loop to maximize melting of one or more layers therein to form a strong and precisely defined seam joint. Ultrasonic welding may also be chosen for joining flexible polymeric sheets because of its speed, cleanliness (absence of solvents) and production of a strong seam. The melting of the coating layers of the photoconductive sheet provides direct substrate to substrate contact of the opposite ends and fusing them into a seam.

Ultrasonic welding is a process that uses high frequency mechanical vibrations above the audible range. The vibrations are produced at the tip of a welding sonotrode or horn. The vibratory force emanating from such a horn device can be generated at high enough frequencies to soften or melt thermoplastic material components intended to be joined together. For example, such frequencies can be effective at 20, 30 or 40 kHz. One of the main advantages of ultrasonic welding may be found in the very short welding steps that enhance its usefulness even in mass production. Weld times may last less than a second. Thus, the process has been utilized in many industries and applications.

Ultrasonic welding can be accomplished at various distances from the horn ranging from only a fraction of a millimeter up to several centimeters. For distant welding the polymer must transmit the energy efficiently, i.e. not be too flexible or have too high a loss modulus. A copolymer of acrylonitrile, butadiene, and styrene (ABS) and high impact polystyrene is among the easiest polymers to weld ultrasonically. Ultrasonic welding will usually join amorphous thermoplastics more readily than semicrystalline ones. However, the advent of more powerful machines has blurred this distinction, and semicrystalline polymers are now welded routinely.

The ultrasonic welding process may entail holding down the overlapped ends of a flexible imaging member sheet with vacuum against a flat anvil surface and guiding the tip end of an ultrasonic vibrating horn transversely across the entire width of the sheet, over and along the overlapped ends, to form a welded seam. The ultrasonic vibration frequency applied for joining the photoreceptor belt/loop ends is kept so high that a frictional heat results upon contact with material to be joined. The heat causes softening or melting of contact portion which results in fusing the joined belt end pieces without any horn burn blemishes in the form of undesirable raised, rough and brittle welds.

Unfortunately, the ultrasonic welding joining process can result in the formation of flashing and splashing that project, respectively, beyond the edges of the belt and onto either side of the overlap region of the slam. The excessive thickness of the photoreceptor belt in the seam region due to the presence of the splashing and seam overlap may result in a larger induced bending strain at the seam than at the remainder of the photoreceptor belt as the seam passes over each support roller. Moreover, excessive seam thickness and irregular splash protrusions can cause the development of large lateral friction forces against cleaning blades during electrophotographic imaging and cleaning cycles. This mechanical interference has been observed to severely affect the life of the imaging belt, exacerbate blade wear, and induce belt velocity variations during belt cycling.

The seam flashing can be removed from either edge of the belt with the use of, for example, a reciprocating punch or notching device. The reciprocating punch has a small circular cross section and removes the flashing and part of the seam to form a generally semi-circular notch in either edge of the belt. Other innovative efforts have been employed to improve seam morphology such as seam surface smoothing by polishing; seam life extension by scribing the top surface of the seam to relieve bending stress/stress; and shape alteration of imaging sheet ends by mechanical grinding prior to overlapping and welding have all been successfully demonstrated, these techniques nevertheless are cumbersome and very costly to implement. To provide mechanically robust imaging member belts that meet the future electrostatographic imaging requirements, it has therefore become apparent that preparation of seamless imaging member belts is important to eliminating the flexible belt's seam-associated shortcomings.

REFERENCES

U.S. Pat. No. 4,410,575, commonly assigned, discloses a method for lap welding fabrics together by superposing two end portions of one or two fabrics on each other with an interposing synthetic polymeric bonding tape between the superposed two end portions. The method includes applying a high frequency wave treatment and/or heat treatment to the interposed portion of the bonding tape through at least one of the superposed end portions while pressing them, to melt the interposed portion of the bonding tape thereby lap welding the end portions of the fabric or fabrics to each other. At least one side edge portion of the tape extends outwardly over an edge of the end portion which is deformed from the forces absorbed when the heat treatment and frequency wave treatment are applied. The fabrics may be made of any fiber.

U.S. Pat. No. 5,688,355, commonly assigned, discloses a seamed flexible belt and process for fabricating the belt. A multiple-layered electrophotographic imaging member belt is prepared by utilizing an excimer laser ablation technique to remove precision amounts of material from the bottom and the top of two opposite ends of a imaging member cut sheet prior to overlapping the two opposite ends and ultrasonically welding the overlap into a welded seam. The resulting multi-layered imaging member belt thus obtained has a welded seam of little added thickness and a reduced amount of seam splashing formations.

U.S. Patent Application Publication No. 2002/0079049 A1 (U.S. application Ser. No. 09/683,326) discloses a seamless flexible electrostatographic imaging member belt fabrication method comprising providing a flexible substrate support sheet, producing first desired features on a first portion of the substrate support sheet, including removing material from the substrate support sheet with first emissions, producing second desired features on a second portion of the substrate support sheet complementary to the first desired features, including removing material from the substrate support sheet with second emissions, overlapping the first and second desired features, bonding the first desired pattern with the second desired pattern to produce a seamed belt and applying at least one coating to the substrate support sheet.

SUMMARY

Aspects disclosed herein include:

a method for manufacturing a substantially seamless flexible electrophotographic imaging member belt fabrication method comprising providing a flexible substrate support sheet comprising a strip of material wherein the material comprising a carbon-black loaded polyimide polymer of at least first and second vertical edges, having a first vertical strip edge and a second vertical strip edge, a top image side and a bottom non-image side; ultrasonically welding the first vertical strip edge to the second vertical strip edge to form a seam; laser ablating the seam to remove raised material on at least the image side of the flexible substrate support sheet;

a system comprising a seamless flexible electrophotographic imaging member comprising a flexible substrate strip material having an unmelted photodecomposed seam of carbon-black loaded polyimide polymer; and an electrophotographic printing system comprising a belt electrophotographic imaging member comprised of a carbon-black loaded polyimide polymer with an unmelted photodecomposed seam.

BRIEF DESCRIPTION OF THE DRAWINGS

Various of the above mentioned and further features and advantages will be better understood from this description of embodiments thereof, including the attached drawing figures wherein.

DETAILED DESCRIPTION

Figure 1:
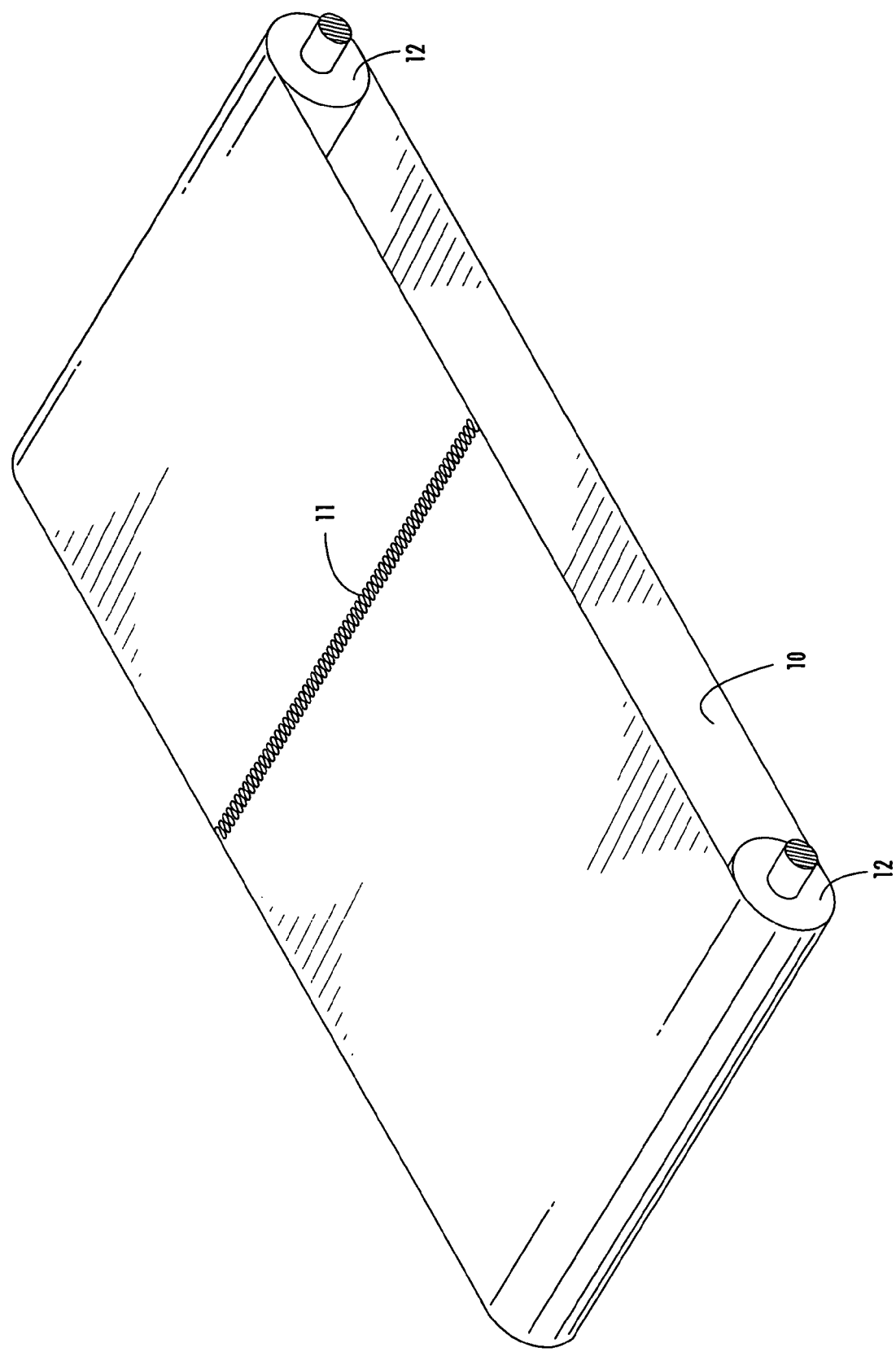
FIG. 1 is an isometric representation of a seamed intermediate transfer belt.

In embodiments, there is illustrated a method for manufacturing a substantially seamless flexible electrophotographic imaging member belt fabrication method comprising providing a flexible substrate support sheet comprising a strip of material wherein the material comprising a carbon-black loaded polyimide polymer of at least first and second vertical edges, having a first vertical strip edge and a second vertical strip edge, a top image side and a bottom non-image side; ultrasonically welding the first vertical strip edge to the second vertical strip edge to form a seam; laser ablating the seam to remove raised material on at least the image side of the flexible substrate support sheet.

In one embodiment, the carbon-black loaded polyimide polymer is Kapton®, which may be the predominant material of the entire strip material or about the seam area. The seam may be straight in form, curved, curvilinear, or any shape—such as a puzzle-cut form. The ultrasonic weld may be formed by using, for example, one or more ultrasonic welding horns of the art.

A seamed flexible belt and process for fabricating the belt is disclosed. Multiple-layered electrophotographic imaging member belt is prepared by utilizing an excimer laser ablation technique to remove precision amounts of material from the bottom and the top of two opposite ends of a imaging member, overlapping the two cut opposite ends, and ultrasonically welding the overlap into a welded seam. The resulting multi-layered imaging member belt thus obtained has a welded seam of little added thickness and a reduced amount of seam splashing formations.

The laser used may be any one of a number of lasers known in the art, such as an excimer laser. The laser in one embodiment produces a photon energy above the molecular bonding energy for the polyimide, but below that associated with melting or evaporating the material. When the carbon-black loaded polyimide is Kapton®, the photon energy may be outside of the infrared range (which may cause melting), and may be about 100 nm to about 690 nm, or alternatively about 180 nm to about 400 nm. Photon energies in the UV range, such as 193 nm, 248 nm, 351 nm, may permit molecular-bound breaking without melting or evaporation of the material which may be associated with less than smooth seams. The idea is to ablate the seam region without affecting the material underneath. For speed of processing, it may be useful to use less than 10 pulses of the laser to obtain the smooth seam. A mask may be employed on either side of the seam to prevent any unintended effect on material surrounding the seam.

In yet another embodiment, there is disclosed a seamless flexible electrophotographic imaging member comprising a flexible substrate strip material having an unmelted photodecomposed seam of carbon-black loaded polyimide polymer. Such substantially seamless (i.e., having a non-raised smooth seam) wherein material on each side of the seam is at about the same elevation) flexible substrate strip may be used in electrophotographic printing systems, such as xerographic systems. Again, the seam line may take any shape—straight, curved, curvilinear, puzzle-shaped, and the lateral cut may be at any angle, including substantially vertical or sloped.

Now turning to the figures, FIG. 1 shows a belt-type photoreceptor 10 supported by a pair of rollers 12. The substrate material is cut, and the ends are joined and bonded at a seam 11 to form a belt. The belt may then be coated with layers to form the photoreceptor.

Figure 2:
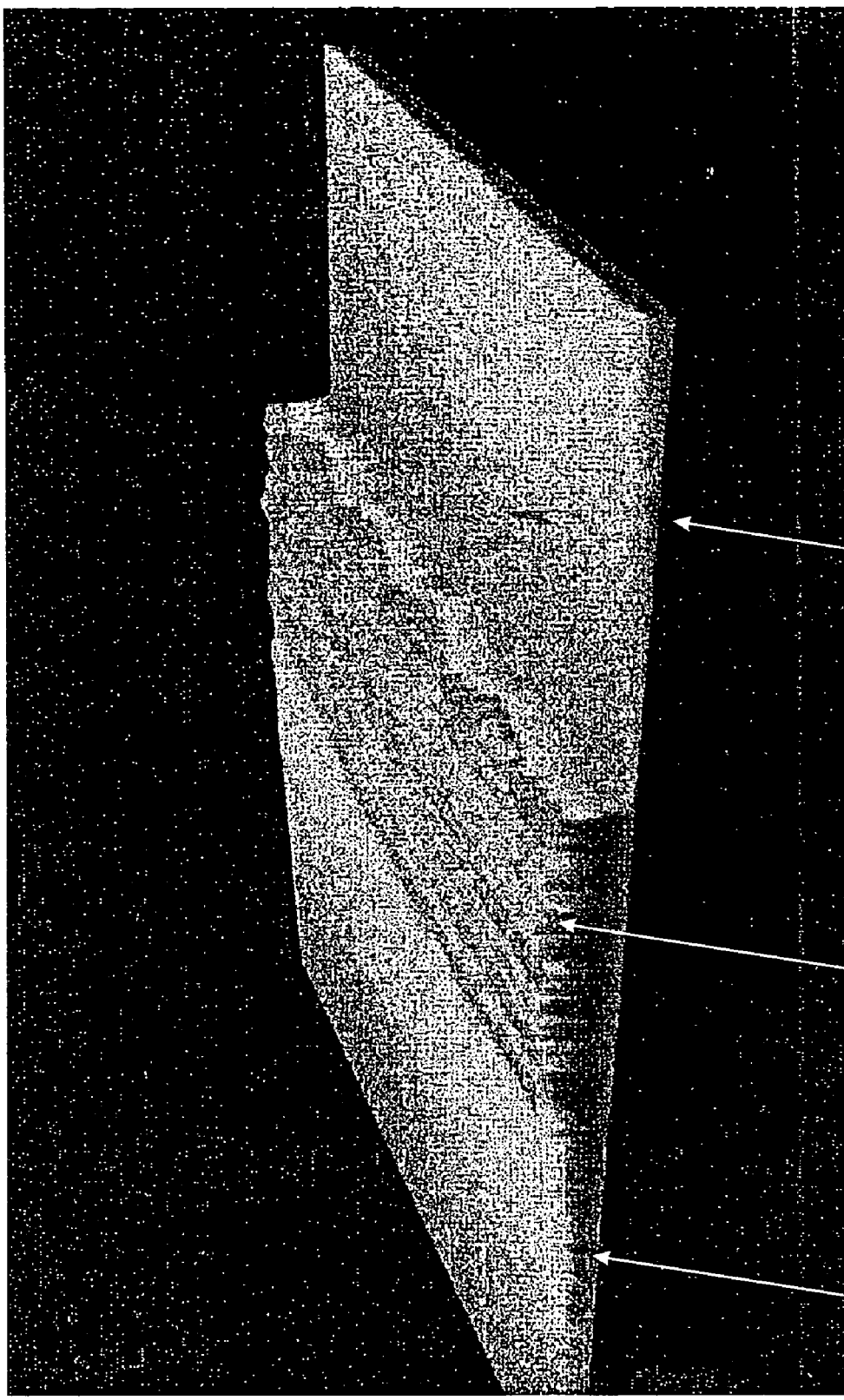
FIG. 2 is a scanning electron micrograph of a carbon-black loaded polyimide seam formed by ultrasonic welding followed by laser ablation of raised portions above the seam line.

FIG. 2 is a scanning electron micrograph of a carbon-black loaded polyimide polymer comprising Kapton®, the seam formed by ultrasonic welding of the two ends 14, 18 of the belt (FIG. 1) and subsequent laser ablation of any material above the seam line 16. As can be seen in the micrograph, the seam is substantially smooth.

While the invention has been particularly shown and described with reference to particular embodiments, it will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for manufacturing a substantially seamless flexible electrophotographic imaging member belt fabrication method comprising:
   providing a flexible substrate support sheet comprising a strip of material wherein said material comprising a carbon-black loaded polyimide polymer of at least first and second vertical edges, having a first vertical strip edge and a second vertical strip edge, a top image side and a bottom non-image side;
   ultrasonically welding said first vertical strip edge to said second vertical strip edge to form a seam;
   laser ablating said seam to remove raised material on at least said image side of said flexible substrate support sheet, wherein after the ultrasonically welding and the laser ablating steps, the seam remains in an unmelted photodecomposed condition; and
   coating a surface of the strip with a photoconductive material.

2. A method in accordance with claim 1 wherein said strip of material comprises predominantly a carbo-loaded polyimide polymer.

3. A method in accordance with claim 1 wherein said ultrasonic welding is performed using an ultrasonic welding horn.

4. A method in accordance with claim 1 wherein said laser is an excimer laser.

5. A method in accordance with claim 1 wherein said laser ablation is performed with a laser producing a wavelength transmission of about 100 to about 690 nanometers or about 180 to about 400 nanometers.

6. A method in accordance with claim 1 wherein said laser ablation is performed with a laser producing a wavelength transmission of about 248 nanometers.

7. A method in accordance with claim 1 wherein said laser ablation occurs with less than about 10 pulses of the laser.

8. A method in accordance with claim 1 wherein said laser ablation employs a mask on either side of said seam when ablating said seam.

9. A method in accordance with claim 1 wherein at least one of said vertical edges is straight.

10. A method in accordance with claim 1 wherein at least one of said vertical edges is puzzle cut.

11. A method in accordance with claim 1 wherein both of said vertical edges are puzzle cut.

12. A seamless flexible electrophotographic imaging member comprising a flexible substrate strip material having an unmelted photodecomposed seam of carbon-black loaded polyimide polymer, wherein the strip material comprises a photoconductive material formed thereupon.

13. An electrophotographic imaging member in accordance with claim 12 wherein said seam is sloping.

14. An electrophotographic imaging member in accordance with claim 12 wherein said flexible strip material is in the form of a belt.

15. An electrophotographic imaging member in accordance with claim 12 wherein said flexible substrate strip has only one seam.

16. An electrophotographic imaging member in accordance with claim 12 wherein said seam is covered with a polymeric material.

17. An electrophotographic imaging member in accordance with claim 12, wherein the electrophotographic imaging member is coated with one or more photoconductive layers.

18. An electrophotographic printing system comprising a belt electrophotographic imaging member comprised of a carbon-black loaded polyimide polymer with an unmelted photodecomposed seam, wherein the belt comprises a photoconductive material formed thereupon.

19. An electrophotographic printing system in accordance with claim 18, wherein the electrophotographic imaging member is coated with one or more photoconductive layers.

* * * * *